United States Patent [19]

Snowden et al.

[11] Patent Number: 5,247,519
[45] Date of Patent: Sep. 21, 1993

[54] SELECTIVE CALL RECEIVER PROGRAMMING SYSTEM

[75] Inventors: Gregory O. Snowden, Boca Raton; Rick Johnson; Thomas F. Holmes, both of Boynton Beach; Mark T. Stair, Delray Beach, all of Fla.

[73] Assignee: Motorola, Inc., Schaumburg, Ill.

[21] Appl. No.: 541,228

[22] Filed: Jun. 20, 1990

[51] Int. Cl.$^5$ .............................. H04J 3/26
[52] U.S. Cl. ......................... 370/94.1; 340/825.44
[58] Field of Search .................. 455/231; 340/825.44, 340/825.04, 825.06, 825.22, 825.29, 825; 370/94.1

[56] References Cited

U.S. PATENT DOCUMENTS

| 4,422,071 | 12/1983 | de Graaf | 340/825.44 |
| 4,437,095 | 3/1984 | Akahori et al. | 340/825.44 |
| 4,525,865 | 6/1985 | Mears | 455/186 |
| 4,790,024 | 1/1989 | Sakoh et al. | 340/825.44 |
| 4,839,628 | 6/1989 | Davis et al. | 340/825.44 |
| 4,860,003 | 8/1989 | DeLuca et al. | 340/825.44 |
| 4,860,004 | 8/1989 | Davis | 340/825.44 |
| 4,860,005 | 8/1989 | DeLuca et al. | 455/231 |
| 4,952,929 | 8/1990 | DeLuca et al. | 340/825.44 |
| 4,962,377 | 10/1990 | Wallace et al. | 348/825.44 |
| 4,975,693 | 12/1990 | Davis et al. | 340/825.44 |

Primary Examiner—Douglas W. Olms
Assistant Examiner—Melvin Marcelo
Attorney, Agent, or Firm—Gregg E. Rasor; William E. Koch; Thomas G. Berry

[57] ABSTRACT

A radio frequency programmable selective call receiver (100) provides a received signal having a recovered address, a command code, and a programming field. A decoder determines selection of the selective call receiver in response to correlating the recovered address (403) with a predetermined address stored in a non-volatile memory (107) that includes a plurality of registers for storing a plurality of configuration words which determine operational characteristics of the selective call receiver (100). A controller (105) selects and executes a bulk programming mode (1004) when a recovered data word (503) is unmasked, or a selective programming mode (1008, 1009, 1010, 1011, 1012) when the recovered data word (503) is masked. The bulk programming mode modifies at least one programmable option of the selective call receiver (100) by re-writing all programmable options in the range of a plurality of registers with data included in the unmasked data word. The selective programming mode modifies at least one programmable option of the selective call receiver (100) be re-writing only a specified register, thus changing only the selected at least one programmable option and preserving any other options in the specified register.

24 Claims, 6 Drawing Sheets

|  | | UNMASKED | | MASKED | |
|---|---|---|---|---|---|
| ASCII bits | 7 | 0 | 0 | 1 | 1 |
|  | 6 | 1 | 1 | 0 | 1 |
| 4 3 2 1 | 5 | 0 | 1 | 0 | 1 |
| 0 0 0 0 | |  | 0 |  | P |
| 0 0 0 1 | |  | 1 | A |  |
| 0 0 1 0 | |  | 2 | B |  |
| 0 0 1 1 | |  | 3 | C |  |
| 0 1 0 0 | |  | 4 | D |  |
| 0 1 0 1 | |  | 5 | E |  |
| 0 1 1 0 | |  | 6 | F |  |
| 0 1 1 1 | |  | 7 | G |  |
| 1 0 0 0 | |  | 8 | H |  |
| 1 0 0 1 | |  | 9 | I |  |
| 1 0 1 0 | |  | : | J |  |
| 1 0 1 1 | |  | ; | K |  |
| 1 1 0 0 | | , |  | L |  |
| 1 1 0 1 | | - |  | M |  |
| 1 1 1 0 | | . |  | N |  |
| 1 1 1 1 | |  | ? | O |  |

*FIG. 11*

SELECTIVE CALL RECEIVER PROGRAMMING SYSTEM

FIELD OF THE INVENTION

This invention relates in general to selective call receiver programming systems, and more particularly to a radio frequency linked selective call receiver programming system.

BACKGROUND OF THE INVENTION

Contemporary selective call receivers are generally controlled by an integrated circuit controller, for example a microcomputer, and include non-volatile memory storage. Typically, a portion of the non-volatile memory, commonly referred to as a code plug, is dedicated to the storage of receiver configuration and address data that is accessed by the microcomputer. This data may be stored in the form of digital "words" that are interpreted by the microcomputer in a conventional manner to characterize the operation of the selective call receiver. By altering the code plug information, the various options, features, and functions of a selective call receiver may be varied (programmed) via a selective call receiver programmer.

Present programmers for a selective call receiver typically require a dedicated hard wired device to interface and effect changes in the receiver's code plug. This constraint, and the fact that the physical design of each receiver's packaging varies, dictates the use of several different electrical connectors to establish a physical connection with the programmer. Consequently, a unique programmer (or programmer interface) may be needed for each selective call receiver. This is a costly and inconvenient method for use by Radio Common Carriers (large paging service providers), as they must maintain unique equipment for each receiver model and a knowledgeable support person to effect the programming changes.

Because of the demands of Radio Common Carriers and other selective call receiver customers for a more convenient method of programming selective call receivers, manufacturers now offer a more versatile and secure programming method using over-the-air (OTA) radio transmissions. Present OTA programming schemes permit the alteration of a selective call receiver's signalling protocol or bulk (complete) code plug data. However, these systems fail to fully meet the needs of a user that wants to merely add or delete an option in their selective call receiver. In order to accomplish selective programming of the various options, features, and functions of a selective call receiver, the Radio Common Carriers must maintain a database containing each user's selections. This requirement has created a barrier to selective programming in that additional capital expenditures, maintenance personel, and mass storage equipment must be provided. Accordingly, contemporary programming techniques are still limited to the complete (bulk) reprogramming of the user's selective call receiver code plug.

SUMMARY OF THE INVENTION

In carrying out the above, there is provided a radio frequency selective call receiver that receives a signal and recovers an address and at least one data packet therefrom. The selective call receiver's decoder determines the selection of the selective call receiver, and the control means determines the selection of one of a bulk or a selective programming mode in response to a data word recovered from the at least one data packet.

BRIEF DESCRIPTION OF THE DRAWINGS

FIG. 11 is an encoding table used for generating the unmasked and masked data from ASCII bytes.

DESCRIPTION OF A PREFERRED EMBODIMENT

Figure 1:
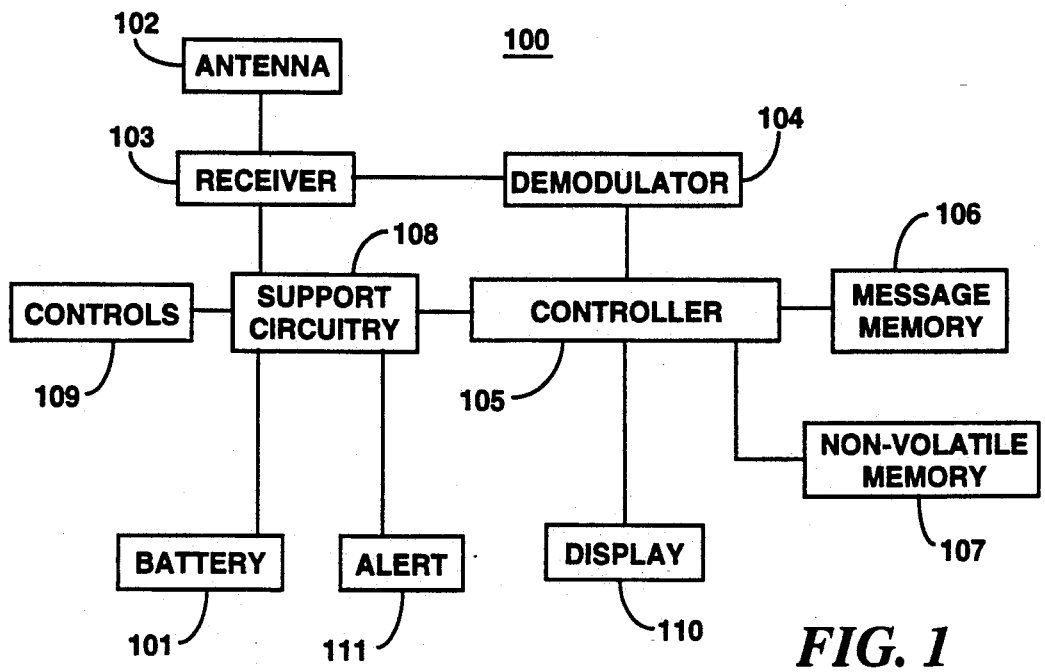
FIG. 1 is a block diagram of a selective call information display receiver.

Referring to FIG. 1, a battery (101) powered selective call receiver operates to receive a signal via an antenna 102. The received signal is routed from the antenna 102 to a receiver 103. The receiver 103 couples a received signal to a demodulator 104, which recovers any information present using conventional techniques. The recovered information is then coupled to a controller 105, which interprets and decodes the recovered information. In a preferred embodiment, the controller 105 comprises a microprocessor having a signal processor (decoder) implemented in both hardware and software.

The recovered information is checked by the decoder which implements a signal processor that correlates a recovered address with a predetermined address stored in the selective call receiver's (100) non-volatile memory 107. The non-volatile memory 107 typically has a plurality of registers for storing a plurality of configuration words that characterize the operation of the selective call receiver. In determining the selection of the selective call receiver, a correlation is performed between a predetermined address associated with the selective call receiver and a received address. When the addresses correlate, the controller 105 couples message information to the message memory 106. In accordance with the recovered information and settings associated with the user controls (109), the selective call receiver presents at least a portion of the message information, such as by a display 110, and signals the user via an audible or sensible alert 111 that a message has been received. The user may then view the information presented on the display 110.

The support circuitry 108 preferably comprises a conventional signal multiplexing integrated circuit, a voltage regulator and control mechanism, environmental sensing circuitry such as for light or temperature conditions, audio power amplifier circuitry, control interface circuitry, and display illumination circuitry. These elements are arranged in a known manner to provide the display information receiver as requested by the customer.

Figure 2:
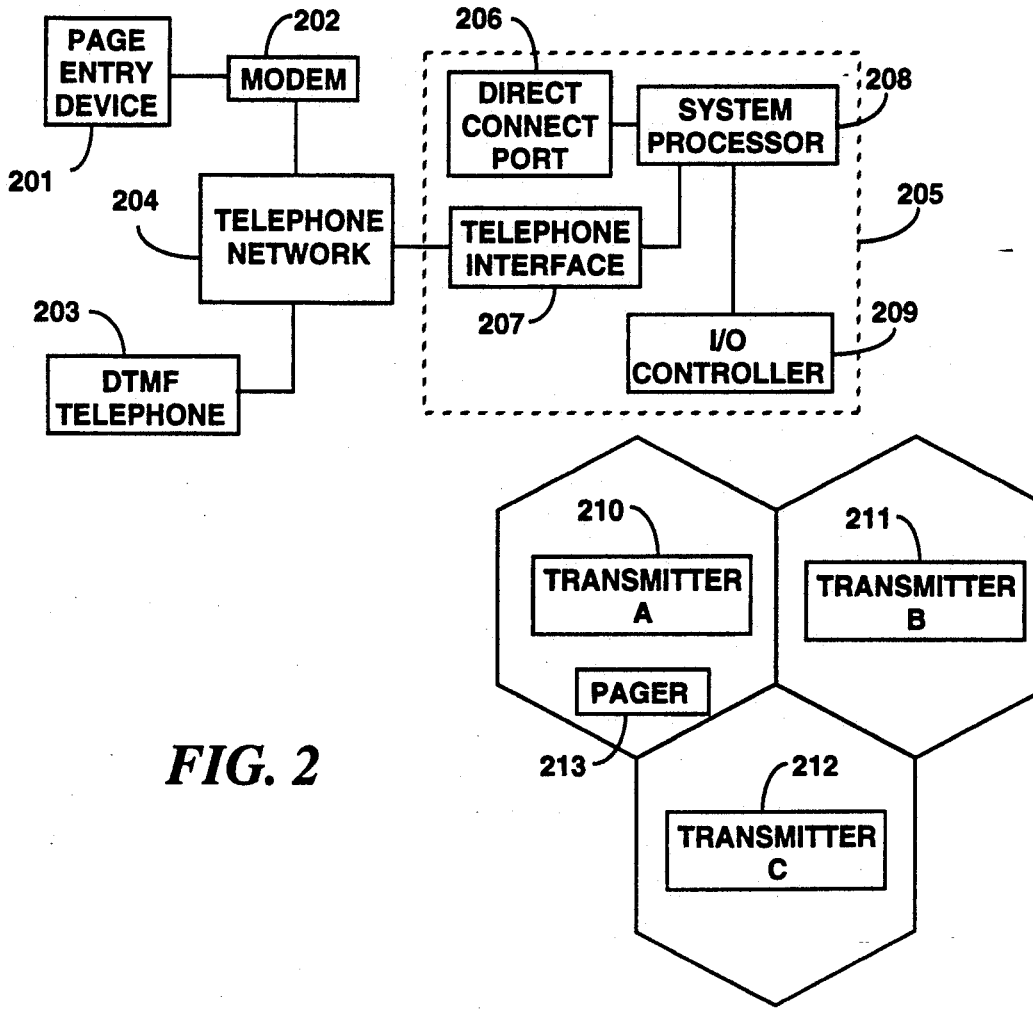
FIG. 2 is an illustration of an over-the-air programming system in accordance with the present invention.

Referring to FIG. 2, the programming system of the present invention uses a page entry device 201 (a microcomputer or application specific entry device) via a modem 202 or DTMF (dual-tone multi-frequency) telephone 203, to access an information processing terminal (paging terminal) 205 via any public or private telephone network 204. The paging terminal 205 comprises a direct connect port 206, telephone interface 207, system processor 208, and I/0 controller 209. The direct connect port 206 is used to provide high speed, full duplex communications to the system processor 208, thus providing a user with the capability of remotely controlling the operation of the paging terminal 205. In any particular implementation of the present invention, the user may want to control the paging terminal 205 from a remote site via a microwave communications link or the like. In this way, the remote user would be able to connect their microcomputer (or page entry device 201) to a radio frequency (RF) modem (not shown) capable of originating a link signal, and the paging terminal 205 would be remotely controllable so long as a compatible RF modem to answer and complete the link was available.

Referring still to FIG. 2, transmitters A (210), B (211), and C (212) are controlled by the paging terminal 205 through, for example, dedicated phone lines or radio frequency links coupled to the I/0 controller 209. The I/0 controller 209 serves to multiplex the control and data channels required for the transmission of encoded data from the paging terminal 205 to local or remote transmitter sites.

When programming a selective call receiver (pager) 213 using the system in FIG. 2, a user accesses the paging terminal 205 via the page entry device 201 or a conventional DTMF telephone 203. The user's input is relayed through the telephone network 204 to the paging terminal 205. According to the invention, the paging terminal controls access to the programming system as well as processing the user supplied data to create a programming message that is subsequently transmitted to the pager 213. Upon receipt of the programming message, the pager will alter its non-volatile memory contents as determined by the information contained in the programming message.

Figure 3:
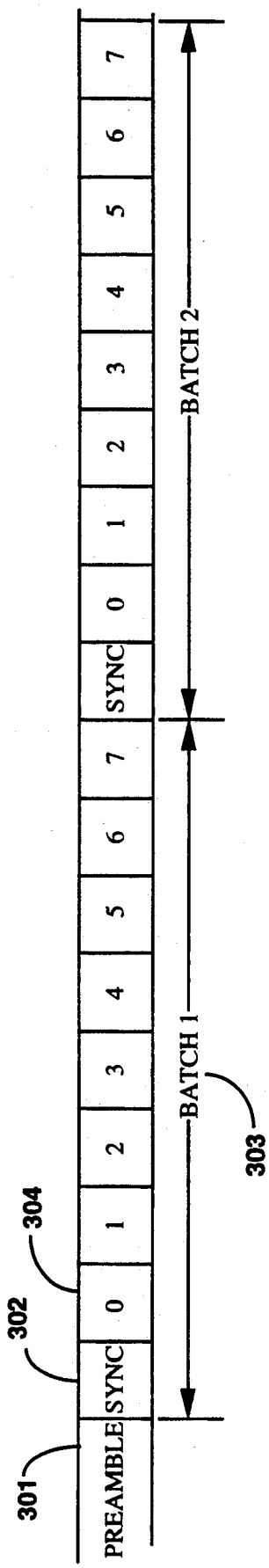
FIG. 3 is a protocol diagram of a typical digital selective call signalling transmission based on the POCSAG coding format.

Referring to FIG. 3, the system employs, for example, a RF binary coded digital signalling scheme such as POCSAG (developed by Great Britain's Post Office Code Advisory Group, detailed in "The Book of the CCIR Radio Paging Code No. 1", Annex 1, British Telecom, 1986) or GSC (Golay Sequential Code, detailed in "Paging Format Guide (TT906)", Motorola, Inc., National Service Training Center, 1986, available from Motorola Communications & Electronics, Inc., 1309 E. Algonquin Road, Schaumburg, Ill. 60196). The POCSAG code format consists of at least a 576-bit preamble 301 and one or more batches (303) of code words. Each batch is preceded by a 32-bit frame synchronization code word (302), (denoted as SYNC), followed by eight (8) 64-bit address frames (304), of two 32-bit selective call address, data words, or idle code words. The frame synchronization code word (302) marks the commencement of each batch of code words (304). Each selective call receiver is assigned at least one unique address that may occur in any one of eight possible time slots (numbered 0-7 in FIG. 3) between synchronization codewords. The codewords containing the data message are sent immediately following the selective call receiver's address. Alphanumeric characters are embedded within the 21 bit information fields as 7 bit ASCII (American Standard Code for Information Interchange) characters. Each POCSAG codeword contains 2 6/7 characters, and one of the information bits in each codeword is reserved to indicate whether the codeword is an address/idle or data codeword. The POCSAG code is well known to those skilled in the art and need not be described further to understand the present invention.

Figure 4:
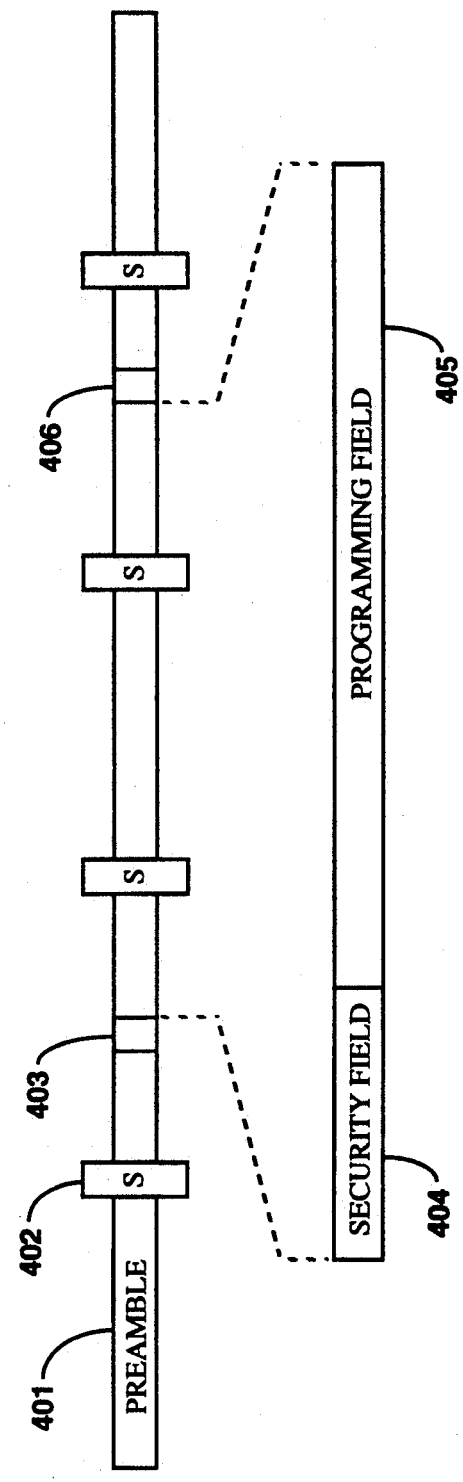
FIG. 4 is a protocol diagram of a typical digital selective call signalling transmission having a programming message embedded.

Referring to FIG. 4, there is shown a POCSAG selective call signalling protocol message stream. The message begins with a preamble 401 and first sync word 402. The selective call receiver detects PREAMBLE 401 and SYNC 402, and then waits for its selective call address 403. The selective call receiver acquires bit synchronization from the PREAMBLE 401 in a known manner, then codeword synchronization from the SYNC 402. After codeword synchronization is complete, POCSAG address and data information is transmitted using using (32,21) BCH type codewords. When the selective call receiver's address is detected, the receiver determines the page type (tone only or data), and if the page is a data type, the decoder begins to receive data words. In the case of an over-the-air (OTA) programming message, the receiver's decoder detects and confirms the information in a security field 404, thus enabling the programming of the receiver's code plug. By the inclusion of a security field in the OTA protocol, the selective call receiver is protected against the unauthorized or accidental programming.

According to the invention, the security field 404 comprises a password and a unit identifier. If desired, the OTA programming apparatus can provide a means for serializing each individual unit with a unique password programmed in the selective call receiver's code plug. The password feature provides extra security in that the owner of the selective call receiver can control the use of their property, and thus, maintain their investment in the selective call receiver. If the security field 404 data matches that required by the selective call receiver, the remaining data codewords (up to the receipt of the next address/idle codeword 406) are treated as the being part of the programming field 405. Upon receiving the next address/idle codeword 406, the receiver processes the received programming field.

Figure 5:
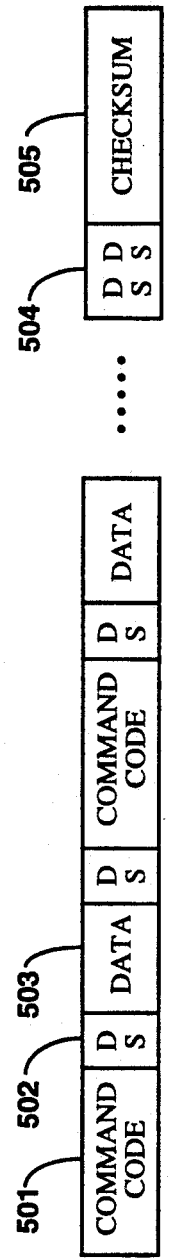
FIG. 5 is a protocol diagram of a digital selective call signalling transmission programming message in accordance with the present invention.

Referring to FIG. 5, an exemplary programming field comprises a command code 501, data separator(s) 502, data block(s) 503, an end of data marker 504, and a programming field checksum 505. Command blocks are formed using conventional techniques of a combination of minor field components. A typical command block comprises a command code 501, data separator(s) 502, and a data packet 503. The total programming field can be formed of any number and combination of command blocks. The only constraint on the length of the programming field, is the maximum message length set by the paging service operator in order to allocate their air-time in the most efficient (and cost effective) manner.

Figure 6:
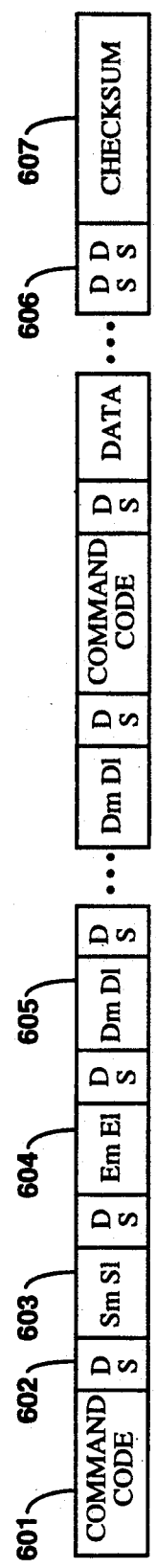
FIG. 6 is a protocol diagram of a digital selective call signalling transmission programming message containing bulk programming data in accordance with the present invention.

Referring to FIG. 6, a preferrer bulk code plug programming field comprises a command code 601, data separator(s) 602, a code plug starting address 603 (in the form of a two nibble byte (Sm S1) where m denotes the most significant nibble and 1 the least significant nibble), a code plug ending address 604 (in the form of a two nibble byte (Em E1) where m denotes the most significant nibble and 1 the least significant nibble), at least one data word 605 (in the form of a two nibble byte (Dm D1) where m denotes the most significant nibble and 1 the least significant nibble), an end of data marker 606, and a programming field checksum 607. The bulk code plug programming field is transmitted when the user desires to change all or substantially all of the data in a specific section of the receiver's code plug. To do this, the paging terminal encoder creates the bulk code plug programming field by determining (preferably from a look-up table related to the model selected) a starting code plug address and an ending code plug address. The code plug option area addresses are mapped in the selective call receiver such that the area of memory to be re-programmed is segmented into nibble (4 bits), byte (8bits), or word (arbitrary number of bits) boundaries. The bulk code plug programming feature is most useful when initially configuring a selective call receiver because bulk programming destroys any data present in the code plug area selected during the programming process.

Figure 7:
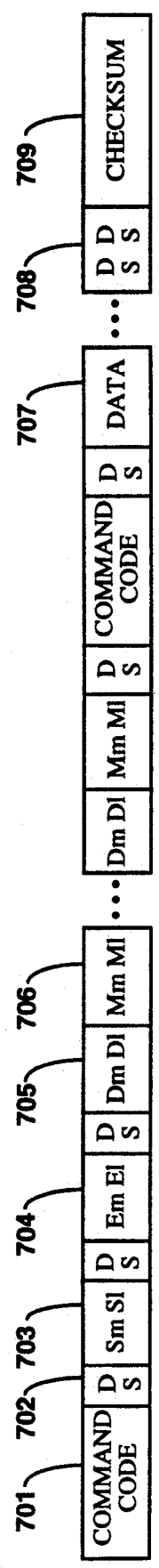
FIG. 7 is a protocol diagram of a digital selective call signalling transmission programming message containing selective programming data in accordance with the present invention.

Referring to FIG. 7, a preferred selective code plug programming field comprises a command code 701, data separator(s) 702, a code plug starting address 703 (in the form of a two nibble byte (Sm S1) where m denotes the most significant nibble and 1 the least significant nibble), a code plug ending address 704 (in the form of a two nibble byte (Em E1) where m denotes the most significant nibble and 1 the least significant nibble), at least one data word 705 (in the form of a two nibble byte (Dm D1) where m denotes the most significant nibble and 1 the least significant nibble), at least one mask word 706 (in the form of a two nibble byte (Mm M1) where m denotes the most significant nibble and 1 the least significant nibble), an additional data block 707, an end-of-data marker 708, and a programming field checksum 709.

The selective code plug programming field shown in FIG. 7 contains data intended to change the state of options previously programmed (preferably using the bulk transfer protocol described above) into the selective call receiver. In the selective programming mode, the paging terminal encoder creates the selective code plug programming field by first determining (preferably from a look-up table related to the model selected) a starting code plug address and an ending code plug address for the option(s) and features to be changed. The code plug option area addresses precede the actual data packets in this embodiment, but since the actual programming need not take place in real time, the starting and ending addresses may be embedded anywhere within the data packet.

As shown in FIGS. 5, 6, and 7, the programming fields contain at least one command code (501, 601, 701). These command codes are used to denote the specific mode of operation associated with the programming request sent to the selective call receiver. In the preferred embodiment, command codes are assigned to the following functions: code plug start and end address to follow including programming data, present the following message one time only, store the following data as a normal message and display, alert user with a predetermined alert sequence, acknowledge programming after completion by echoing programming data back, acknowledge programming after completion by echoing a programming field checksum back, deactivate the selective call receiver, activate the selective call receiver, or enable self test mode. It is clear that the above described command set need not be limited only to those preceding functions, and in fact, the selective call receiver's architecture is preferably designed such that the basic command set is easily extensible.

When a command is chosen that requires acknowledgement or the return of data from the selective call receiver, information can be returned to the programming system via a signal transmitted using the display (110) or alert apparatus (111) as shown in FIG. 1 In a factory programmer, a selective call receiver can perform a complete acknowledgement of programming after completion by echoing programming data back via a light emitting diode that is part of the receiver's alert apparatus (111). In this example, the information to be confirmed could serially pulse code modulate the LED and the resultant transmission could be received using a photo detector placed in close proximity to the receiver's LED.

In the prefer protocol, each command is capable of supporting the inclusion of data that specifies the extent of the action to be executed by the selective call receiver's controller. In executing the selective programming command, the user may alter the status (enabled or disabled) of any selective call receiver options such as the sensible alert (auditory, visual, or vibratory) mode, duplicate message detection, maximum message length, numeric or alphanumeric capability, voice storage, etc. When using the selective programming mode, the user at the paging encoding terminal or remote entry device need not have any prior knowledge of the target selective call receiver's present option configuration. This feature is important in that present programming systems must, in order to preserve options and features resident in a selective call receiver before re-programming, establish a two-way communication link with the receiver. Since present selective call receiver's by design, have no method for establishing a two-way communication link without hard wiring connections to a programmer, this gives the present invention a significant advantage.

Figure 8:
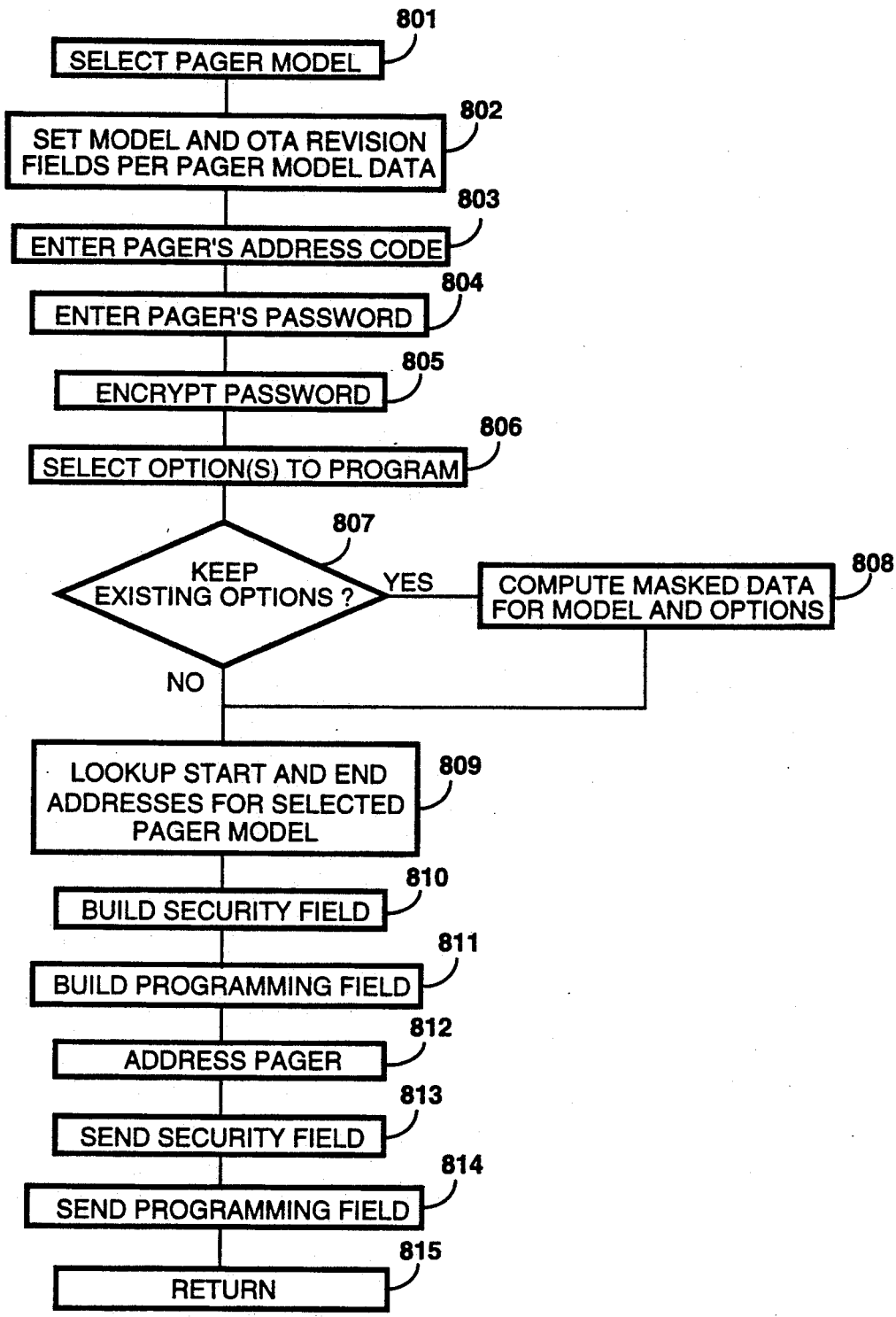
FIG. 8 is a flow diagram of the preferred method for over-the-air programming of a selective call receiver in accordance with the present invention.

Referring to FIG. 8, a flow diagram illustrating the paging terminal over-the-air programming sequence begins when the user selects the desired selective call receiver model (step 801) and the programmer's software sets the correct model and OTA revision fields step 802 using, for example, a look-up table. The user is then prompted in a conventional manner for the address code that corresponds to the target selective call receiver (step 803). The program next prompts the user to enter a password (step 804) that is used in conjunction with the model, OTA revision, and a control field to create the security field. For reasons of system security, the password is encrypted (step 805) using conventional techniques. Once the target selective call receiver is defined, the user selects the option(s) to program (step 806). If the user desires to change any non-command code options such as alert modes, message length, or presentation mode, and do so without altering existing options, the result of decision 807 will be true (keep existing options) and the program computes the masked data programming string for the selected receiver model and options (step 808). If the user does not care about preserving existing options, or desires to change options related to a command code, decision 807 will be false and control is passed to step 809. In step 809, assuming that the user has selected either the bulk or selective programming modes, the program determines the starting and ending code plug addresses for the specific radio model selected in step 801. After determining the starting and ending code plug memory addresses, step 810 builds the security field. As previously discussed, the security field comprises a password field, OTA protocol revision field, model field, and control field. In the preferred embodiment, the security field is required for programming to take place. By requiring the presence of the security field, the probability of a "false" programming of the selective call receiver taking place is substantially reduced (virtually to zero). When the security field is complete, the programmer next builds the programming field (step 810) as discussed above in conjunction with in FIGS. 5, 6, and 7. After the programming field is complete, the programmer creates a first signal comprising a transmitter control signal, the target pager's address (step 812), the security field (step 813), and the programming field (step 814). The first signal is sent to at least one transmitter (see FIG. 2) which broadcasts a second signal (the modulated RF carrier) in response to being activated by the transmitter control signal. At this point, the program returns (step 815) to wait for another pager model selection (step 801) or for termination of the routine.

Figure 9:
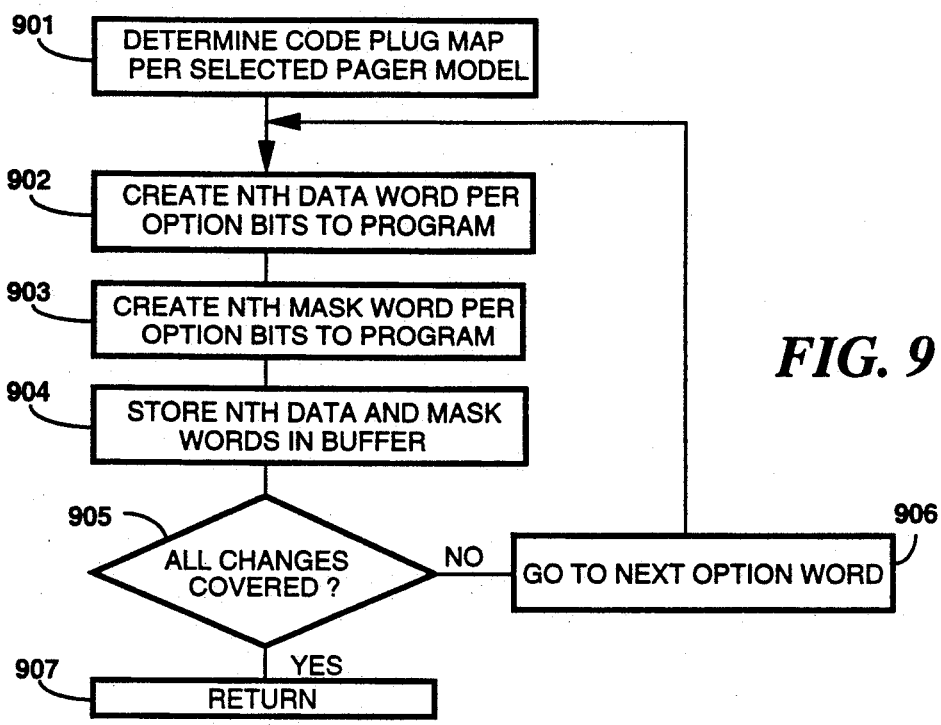
FIG. 9 is a flow diagram of the preferred method for computing the selective option data stream pairs in accordance with the present invention.

Referring to FIG. 9, the computation of the selective programming data by the information processing terminal (step 808 of FIG. 8) comprises: determining the code plug memory map for the selected pager (selective call receiver) model (step 901), creating the Nth data word (data words being numbered from 1 to M with N being the present pointer location) according to the option bits to program (step 902), creating the Nth mask word according to the option bits to program (step 903), storing the Nth data/mask word as a packet into a holding buffer (step 904), testing for the completion of all code plug option changes (step 905), and either continuing to step 902 to process the next data/mask word packet or returning 907 from the flow diagram shown in FIG. 9.

Figure 10:
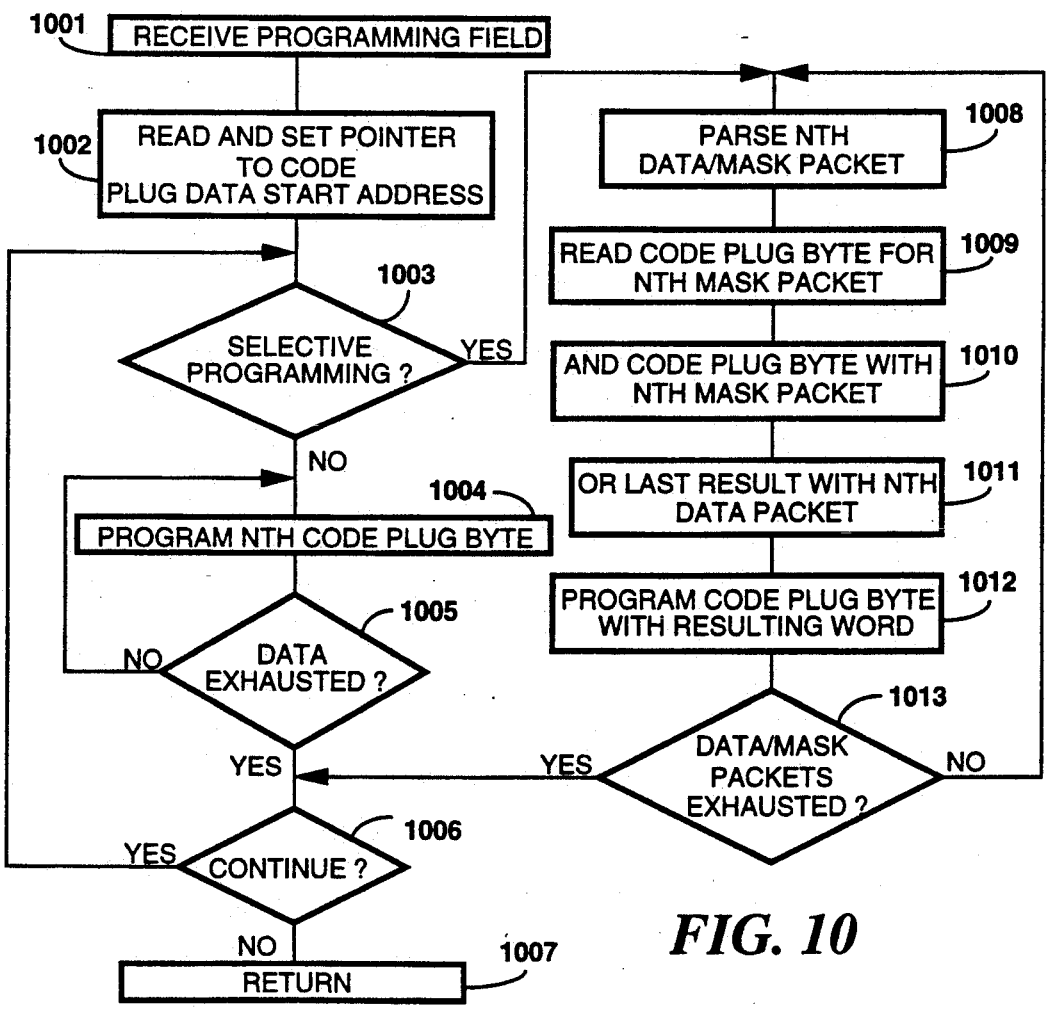
FIG. 10 is a flow diagram of the preferred method for receiving and programming the selective call receiver's code plug in accordance with the present invention.

Referring to FIG. 10, a flow diagram illustrating the receiving of an over-the-air programming message and the programming the selective call receiver's code plug begins after receipt of a correct OTA programming security field and command code by the selective call receiver, the radio receives the programming field (1001), reads the starting code plug address, and sets the current programming pointer to that address (1002). If the data following the separator is unmasked (indicating bulk programming), decision 1003 will be false and the control means (the controller or microprocessor) programs the Nth (current) byte (1004). Following step 1003, step 1004 tests for an end-of-data condition. The processing of bulk programming data bytes is terminated upon detection of one or more data separators (1005). If two consecutive data separators are detected, decision 1006 will be false and control returns (1007) to the selective call receiver's main control program. If decision 1006 is true, control is passed to decision 1003 to test for the contents of the next programming field.

If the data following the separator is masked (indicating selective programming), decision 1003 will be true and the control means (the controller or microprocessor) parses (separates) the Nth data/mask packet (1008) from the received programming field. The control means then reads the code plug byte corresponding to the Nth mask packet (1009), logically AND's the byte with the Nth mask packet (1010), then logically OR's the result with the Nth data packet (1011). By way of example, suppose that the user wants to enable vibratory alert and duplicate message detection options, and disable a battery saving option. In an exemplary code plug byte, assume bit 2 represents the vibrator, bit 4 represents duplicate message detection, and bit 7 represents the battery saver strobe. The code plug byte would then contain the hexidecimal number B9, which when converted to binary is: 10111001. Using the inventive process in steps 1008 to 1011, the results are as follows:

|             |           |                   |
|-------------|-----------|-------------------|
|             | 10111001  | Old Code Plug Byte |
| Logical AND | 01101011  | Mask byte         |
|             | 00101001  | Result            |
| Logical OR  | 00010100  | Data byte         |
|             | 00111101  | New Code Plug Byte |

According to the selective programming protocol of the present invention, bits 0, 1, 3, 5, and 6 from the old code plug byte are preserved in the new code plug byte, while bits 2, 4, and 7 take on new states in the new code plug byte. This process allows, without prior knowledge of the selective call receiver's options, the modification of the selective call receiver's present options, while preserving existing options.

The control means processes data/mask packets until the stream is exhausted. The processing of programming packets is terminated upon detection of one or more data separators 1013. If two consecutive data separators are detected, decision 1006 will be false and control returns 1007 to the selective call receiver's main control program.

Referring to FIG. 11, the table shown is used to encode seven bit ASCII and ISO (International Standards Organization) characters into four bit nibbles. Unmasked data is characterized by bits 5, 6, and 7 being either 010 or 110. Masked data is characterized by bits 5, 6, and 7 being either 001 or 111. By using the table shown to encode programming data, a single set of core algorithms such as those shown in FIG. 9 and FIG. 10 can be used to accommodate both the POCSAG and GSC signalling protocols.

We claim:

1. A radio frequency programmable selective call receiver comprising:
   a receiver for providing a received signal comprising a recovered address, a command code, and a programming field;
   a decoder for determining the selection of the selective call receiver in response to correlating the recovered address with a predetermined address stored in a non-volatile memory, the non-volatile memory including a plurality of registers for storing a plurality of configuration words that determine, at least in part, operational characteristics of the selective call receiver; and
   control means for selecting and executing one of a bulk or a selective programming mode in response to a data word recovered from the programming field;

the bulk programming mode being selected and executed when;

the data word is an unmasked data word; the bulk programming mode operating to modify at least one programmable option of the radio frequency programmable selective call receiver in a range of the plurality of registers by re-writing all programmable options in the range of the plurality of registers with data included in the received unmasked data word; and the selective programming mode being selected and executed when;

the data word is a masked data word; the selective programming mode operating to modify a selected at least one programmable option of the radio frequency programmable selective call receiver included in at least one specified register in the plurality of registers by rewriting only the at least one specified register with data that changes only the selected at least one programmable option, preserving any other options included in the at least one specified register, the data being derived from the masked data word, a received data word corresponding with the masked data word, and a data word read from the at least one specified register in the plurality of registers before programming.

2. The radio frequency programmable selective call receiver according to claim 1 wherein the decoder comprises a signal processor for correlating the recovered address with the predetermined address stored in the non-volatile memory.

3. A radio frequency linked selective call receiver programming system comprising:
   an information processing terminal for generating a first signal having a control signal and at least one data packet;
   a transmitter for broadcasting a second signal in response to the receipt of the control signal;
   at least one selective call receiver for providing a received signal comprising a recovered address, a command code, and a programming field;
   a decoder for correlating the recovered address to a predetermined address stored in a non-volatile memory associated with the at least one selective call receiver, the non-volatile memory including a plurality of registers for storing a plurality of configuration words that determine, at least in part, operational characteristics of the at least one selective call receiver; and
   control means for selecting and executing one of a bulk or a selective programming mode in response to a data word recovered from the programming field;
   the bulk programming mode being selected and executed when;
   the data word is an unmasked data word; the bulk programming mode operating to modify at least one programmable option of the at least one selective call receiver in a range of the plurality of registers by re-writing all programmable options in the range of the plurality of registers with data included in the received unmasked data word; and
   the selective programming mode being selected and executed when;
   the data word is a masked data word; the selective programming mode operating to modify a selected at least one programmable option of the at least one selective call receiver included in at least one specified register in the plurality of registers by re-writing only the at least one specified register with data that changes only the selected at least one programmable option, preserving any other options included in the at least one specified register, the data being derived from the masked data word, a received data word corresponding with the masked data word, and a data word read from the at least one specified register in the plurality of registers before programming.

4. The radio frequency linked selective call receiver programming system according to claim 3 wherein the at least one data packet comprises:
   at least one command code;
   at least one data separator;
   at least one code plug starting address;
   at least one code plug ending address;
   at least one data word;
   at least one mask word;
   an end of data marker; and
   a programming field checksum.

5. The radio frequency linked selective call receiver programming system according to claim 3 wherein the information processing terminal comprises:
   a system processor;
   a direct connect communications port coupled to the system processor for remotely controlling the operation of the information processing terminal that generates the control signal;
   a telephone interface coupled to the system processor for controlling at least the operation of the transmitter that broadcasts the second signal in response to receipt of the control signal; and
   an input/output controller coupled to the system processor for multiplexing control and data channels communicated to local or remote transmitters via the telephone interface.

6. The radio frequency linked selective call receiver programming system according to claim 3 wherein the decoder comprises a signal processor which correlates the recovered address with a predetermined address associated with the selective call receiver.

7. The radio frequency programmable selective call receiver according to claim 3 wherein the non-volatile memory comprises a plurality of registers for storing a plurality of configuration words used to determine, at least in part, operational characteristics of the selective call receiver.

8. The radio frequency programmable selective call receiver according to claim 3 wherein the bulk programming mode is characterized by the data word having an unmasked data word.

9. The radio frequency programmable selective call receiver according to claim 3 wherein the selective programming mode is characterized by the data word having a masked data word.

10. A method of programming a radio frequency linked selective call receiver having a non-volatile memory, the non-volatile memory including a plurality of registers for storing a plurality of configuration words that determine, at least in part, operational characteristics of the radio frequency linked selective call receiver, comprising the steps of:
   receiving a radio frequency signal to provide a recovered address and at least one data packet including at least a command code and a programming field;

correlating the recovered address to a predetermined addresses associated with the selective call receiver;

programming the non-volatile memory using one of a bulk or a selective programming mode that is selected and executed in response to a data word recovered from the programming field included in the at least one data packet;

the bulk programming mode being selected and executed when;

the data word is an unmasked data byte; the bulk programming mode operating to modify at least one programmable option of the radio frequency linked selective call receiver in a range of the plurality of registers by re-writing all programmable options in the range of the plurality of receivers with data included in the received unmasked data byte; and the selective programming mode being selected and executed when;

the data word is a masked data word; the selective programming mode operating to modify a selected at least one programmable option of the radio frequency linked selective call receiver included in at least one specified register in the plurality of registers by re-writing only the at least one specified register with a programming byte that changes only the selected at least one programmable option, preserving any other options included in the at least one specified register, the data being derived from a masked data byte corresponding with the masked data word, a received data byte corresponding with the masked data word, and a code plug byte read from the at least one specified register in the plurality of registers before programming.

11. The method according to claim 10 wherein the programming step comprises the steps of:

reading from the data packet, a starting and an ending non-volatile memory address;

setting a pointer to a non-volatile memory location corresponding with the at least one specified register;

parsing from the data packet, a data/mask packet having the received data byte and the masked data byte;

reading a code plug byte from the non-volatile memory location corresponding to the at least one specified register in the plurality of registers and being associated with the parsed data/mask packet;

logically ANDing the mask data byte with the code plug byte to provide a resultant byte; and logically ORing the resultant byte with the received data byte to provide the programming byte.

12. A method of programming a radio frequency linked selective call receiver having a non-volatile memory, the non-volatile memory including a plurality of registers for storing a plurality of configuration words that determine, at least in part, operational characteristics of the radio frequency linked selective call receiver, the method comprising the steps of:

at a radio frequency linked programming station;

generating a first signal having a control signal and at least one data packet;

broadcasting a second signal in response to the receipt of the control signal;

at a selective call receiver;

receiving the second signal to provide a recovered address and the at least one data packet including at least a programming field;

correlating the recovered address to a predetermined address associated with the selective call receiver; and programming the non-volatile memory using one of a bulk or a selective programming mode that is selected and executed in response to a data word recovered from the programming field included in the at least one data packet;

the bulk programming mode being selected and executed when;

the data word is an unmasked data byte; the bulk programming mode operating to modify at least one programmable option of the radio frequency linked selective call receiver in a range of the plurality of registers by re-writing all programmable options in the range of the plurality of registers with data included in the received unmasked data byte; and the selective programming mode being selected and executed when;

the data word is a masked data word; the selective programming mode operating to modify a selected at least one programmable option of the radio frequency linked selective call receiver including in at least one specified register in the plurality of registers by re-writing only the at least one specified register with a programming byte that changes only the selected at least one programmable option, preserving any other options included in the at least one specified register, the data being derived from a masked data byte corresponding with the masked data word, a received data byte corresponding with the masked data word, and a code plug byte read from the at least one specified register in the plurality of registers before programming.

13. The method according to claim 12 wherein the programming station generating step further comprises the steps of:

determining a code plug memory map for a selected selective call receiver model;

creating at least one data word according to at least one selected option to program;

creating at least one mask word according to the at least one selected option to program; and forming at least one data/mask word packet comprising at least one data word and at least one mask word.

14. A radio frequency programmable selective call receiver having a non-volatile memory, the non-volatile memory including a plurality of registers for storing a plurality of configuration words that determine, at least in part, operational characteristics of the radio frequency linked selective call receiver, the selective call receiver comprising:

a receiver for providing a received signal comprising a recovered address and at least one data packet;

a decoder for determining the selection of the selective call receiver; and control means for selecting and executing a bulk or a selective programming mode in response to a data word recovered from the at least one data packet and at least one of a plurality of programmable modes of operation of the selective call receiver in response to at least one command code recovered from the at least one data packet;

the bulk programming mode being selected and executed when:

the data word is an unmasked data word; the bulk programming mode operating to modify at least one programmable option of the radio frequency programmable selective call receiver in a range of the plurality of registers by re-writing all programmable options in the range of the plurality of registers with data included in the received unmasked data word; and the selective programming mode being selected and executed when:

the data word is a masked data word; the selective programming mode operating to modify a selected at least one programmable option of the radio frequency programmable selective call receiver included in at least one specified register in the plurality of registers by rewriting only the at least one specified register with data that changes only the selected at least one programmable option, preserving any other options included in the at least one specified register, the data being derived from the masked data word, a received data word corresponding with the masked data word, and a data word read from the at least one specified register in the plurality of registers before programming.

15. The radio frequency programmable selective call receiver according to claim 14 wherein the decoder comprises a signal processor which correlates the recovered address with a predetermined address associated with the selective call receiver.

16. The radio frequency programmable selective call receiver according to claim 14 wherein a first command code comprises:

a code denoting that a code plug start and end address follow including programming data.

17. The radio frequency programmable selective call receiver according to claim 16 wherein a second command code comprises:

a code denoting that a message follows which is to be presented one time only.

18. The radio frequency programmable selective call receiver according to claim 17 wherein a third command code comprises:

a code denoting that a data message following is to be stored and displayed as a normal message.

19. The radio frequency programmable selective call receiver according to claim 18 wherein a fourth command code comprises:

a code denoting that a predetermined alert sequence will be user to alert a user upon receipt of a message.

20. The radio frequency programmable selective call receiver according to claim 19 wherein a fifth command code comprises:

a code denoting that the selective call receiver will acknowledge programming after completion by echoing programming data back.

21. The radio frequency programmable selective call receiver according to claim 20 wherein a sixth command code comprises:

a code denoting that the selective call receiver will acknowledge programming after completion by echoing a programming field checksum back.

22. The radio frequency programmable selective call receiver according to claim 21 wherein a seventh command code comprises:

a code to deactivate the selective call receiver.

23. The radio frequency progammable selective call receiver according to claim 22 wherein a eighth command code comprises:

a code to activate the selective call receiver.

24. The radio frequency programmable selective call receiver according to claim 23 wherein a ninth command code comprises:

a code to enable a self test mode in the selective call receiver.

* * * * *